UNITED STATES PATENT OFFICE.

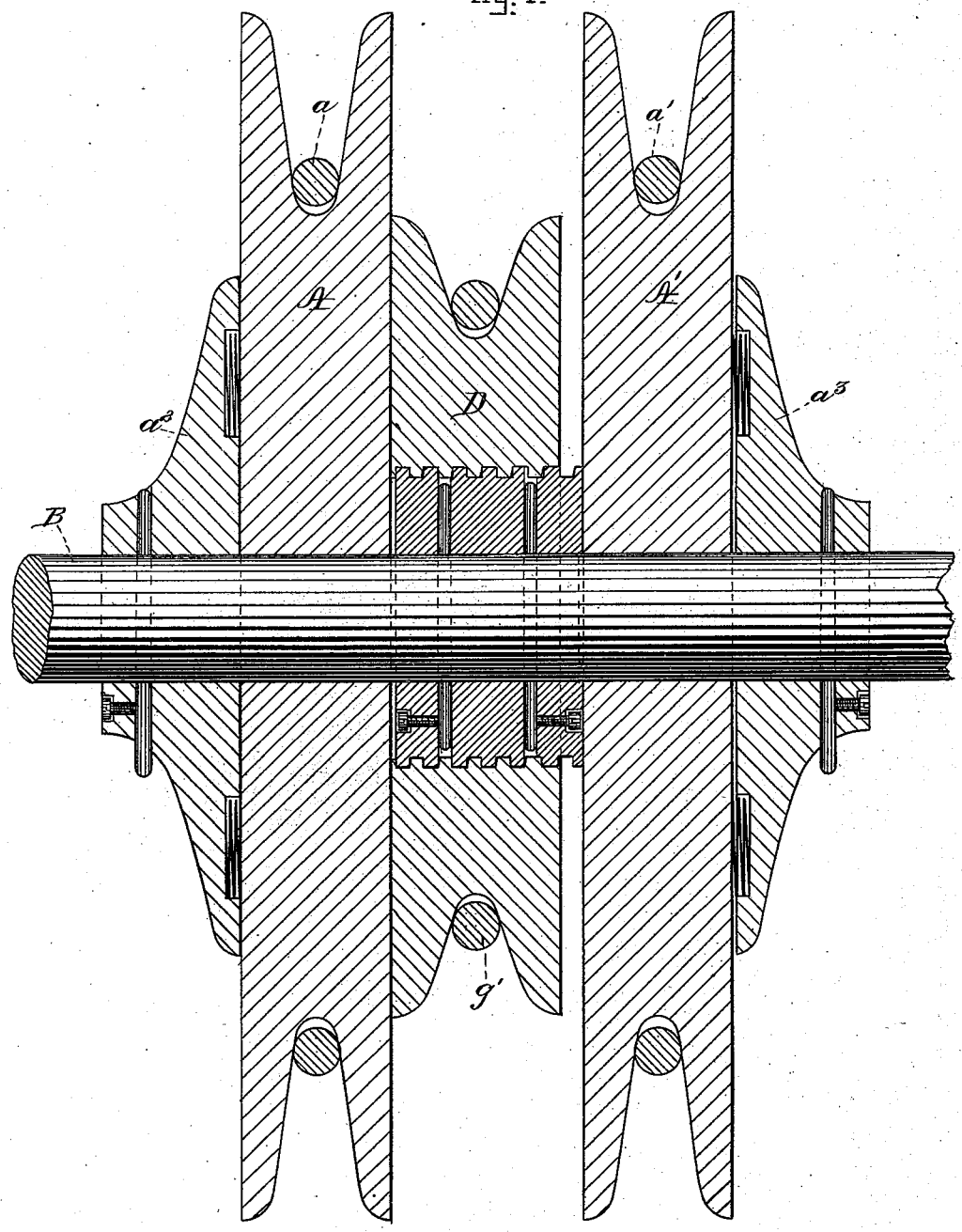

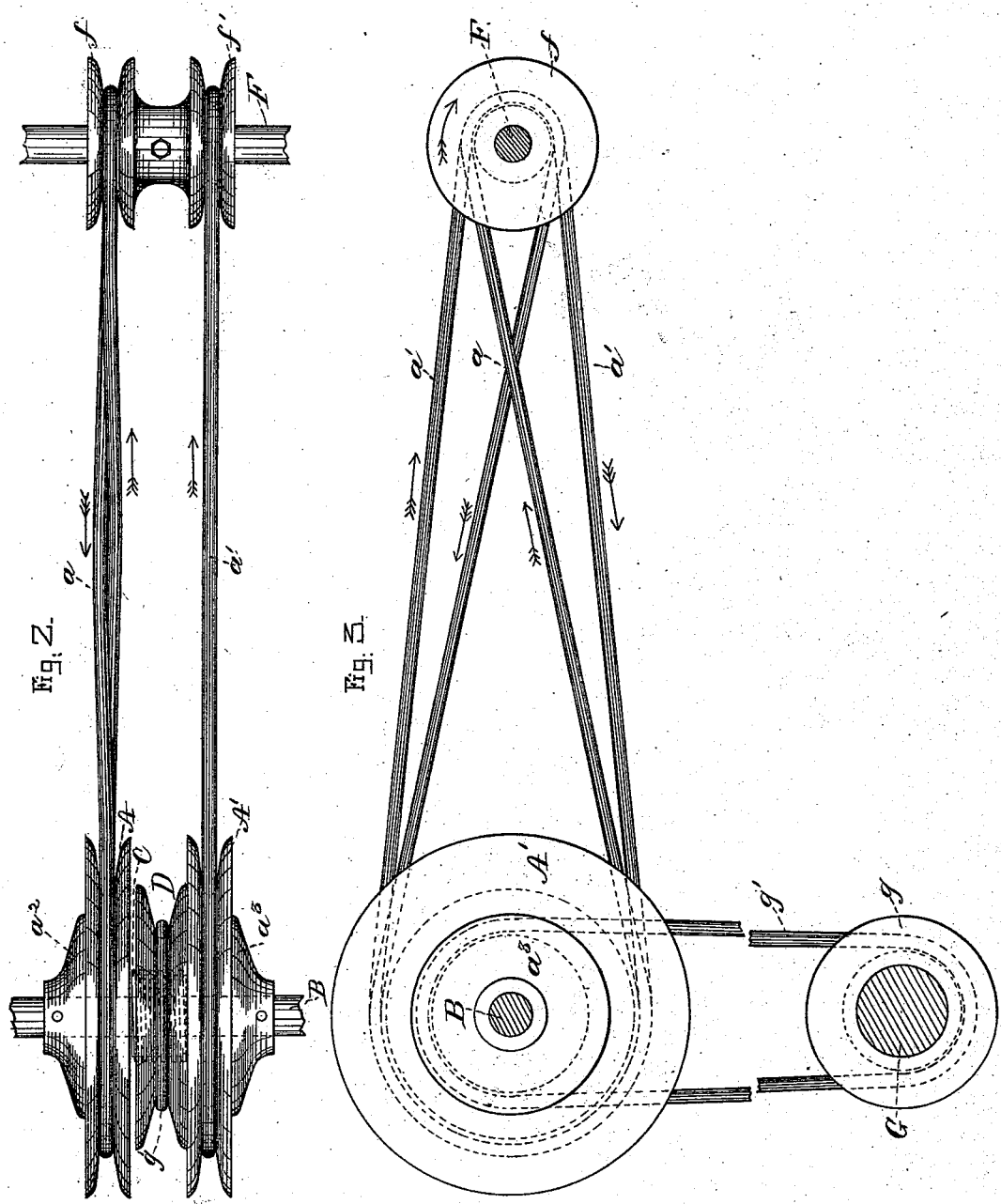

THEODORE M. FOOTE, OF BOSTON, MASSACHUSETTS, ASSIGNOR TO WILLIAM LUMB, TRUSTEE, OF SAME PLACE.

CLUTCH.

SPECIFICATION forming part of Letters Patent No. 378,088, dated February 21, 1888.

Application filed April 23, 1887. Serial No. 235,947. (No model.)

*To all whom it may concern:*

Be it known that I, THEODORE MARSHALL FOOTE, of Boston, in the county of Suffolk and State of Massachusetts, have invented a new and useful Clutch, of which the following is a specification, reference being had to the accompanying drawings, in which—

Figure 1 is a section illustrating my invention; Fig. 2, a plan, and Fig. 3 an elevation of one practical application of my invention.

The simplest form of my invention is a pulley, A, loose upon its shaft B, in combination with screw C, fast to shaft B, and a driver-wheel, D, which forms a nut, as more fully shown in Fig. 1. By means of this contrivance the pulley A may be clutched to shaft B by the travel of nut D on the screw C, as shown in Fig. 1, and may be unclutched from shaft B by the reversed motion of the nut D.

The addition of a second loose pulley, A', makes the contrivance shown in Figs. 2 and 3, by which the motion of the driving-shaft G in either direction will give a motion always in the same direction to shaft F. In this case power is applied through shaft G, which is belted to nut D by a pulley, $g$, and belt $g'$, the periphery of the nut D being formed as a pulley to receive belt $g'$. When the shaft G revolves in one direction, the belt $g'$ causes nut D to travel on screw C until nut D is pressed close against pulley A and pulley A close against collar $a^2$, thereby causing pulley A, shaft B, screw C, and nut D all to revolve with shaft G and in the same direction; but as pulley A is belted by cross-belt $a$ to a pulley, $f$, which is fast to shaft F, shaft F will be revolved in the direction opposite to that of shaft B and shaft G. Should shaft G be reversed in its direction, the belt $g'$ causes nut D to travel on screw C away from pulley A and into close contact with pulley A', thereby clamping pulley A' between nut D and collar $a^3$ and reversing the motion of the shaft B; but as shaft B and pulley A' are connected by belt $a'$ with pulley $f'$, which is fast to shaft F, it is clear that shaft F will be revolved in the same direction as before. This device is intended more especially to connect the axle of a car, locomotive, or the like with a dynamo-machine or with any machine whose direction cannot be reversed.

It will be obvious that the pulleys D and $g$ may be gears if they are near enough together, or they may have an intermediate gear between them.

I am aware of Barlow's patent, No. 7,557, dated August 13, 1850, and disclaim all that is shown in it.

What I claim as my invention is—

1. In combination, driving-shaft G, driven shaft B, driving-wheel $g$, driven wheel D, loose pulley A, collar $a^2$, and screw C, the collar and screw being fast to the shaft B, and the driving-wheel D forming a nut for the screw C, all substantially as and for the purpose set forth.

2. In combination, driving-shaft G, driven shaft B, driving-wheel $g$, driven wheel D, loose pulleys A A', collars $a^2$ $a^3$, and screw C, the collars and screw being fast to shaft B, and the driven wheel D forming a nut for the screw C, all substantially as described.

T. M. FOOTE.

Witnesses:
J. E. MAYNADIER,
GEO. W. WISWELL.